(12) United States Patent
Weinstock

(10) Patent No.: US 10,939,116 B2
(45) Date of Patent: Mar. 2, 2021

(54) ADAPTIVE VARIATION OF CHROMA SUBSAMPLING IN IMAGE COMPRESSION

(71) Applicant: Raritan Americas, Inc., Somerset, NJ (US)

(72) Inventor: Neil Weinstock, Randolph, NJ (US)

(73) Assignee: Raritan Americas, Inc., Somerset, NJ (US)

(*) Notice: Subject to any disclaimer, the term of this patent is extended or adjusted under 35 U.S.C. 154(b) by 0 days.

(21) Appl. No.: 16/286,130

(22) Filed: Feb. 26, 2019

(65) Prior Publication Data
US 2020/0275102 A1 Aug. 27, 2020

(51) Int. Cl.
| H04N 19/176 | (2014.01) |
| H04N 19/132 | (2014.01) |
| H04N 19/186 | (2014.01) |
| H04N 19/88 | (2014.01) |

(52) U.S. Cl.
CPC ......... H04N 19/132 (2014.11); H04N 19/176 (2014.11); H04N 19/186 (2014.11); H04N 19/88 (2014.11)

(58) Field of Classification Search
CPC .. H04N 19/132; H04N 19/176; H04N 19/186; H04N 19/88
See application file for complete search history.

(56) References Cited

U.S. PATENT DOCUMENTS

| 2003/0026477 | A1 | 2/2003 | Ishiga | |
| 2006/0268990 | A1* | 11/2006 | Lin | H04N 19/117 375/240.24 |
| 2007/0046687 | A1* | 3/2007 | Soroushi | G09G 5/026 345/589 |
| 2009/0279804 | A1* | 11/2009 | Ahmed | H04N 1/4406 382/248 |
| 2016/0314610 | A1* | 10/2016 | Lee | G06T 15/005 |
| 2017/0359586 | A1* | 12/2017 | Xue | H04N 19/17 |

FOREIGN PATENT DOCUMENTS

| EP | 2456204 | 5/2012 |
| WO | 2015/143671 | 10/2015 |

OTHER PUBLICATIONS

Shun-Ichi Sekiguchi et al: "On adaptive chroma sampling for 4:4:4 video coding", 82. MPEG Meeting; Oct. 22, 2007-Oct. 26, 2007; Shenzhen; (Motion Picture Expert Group or ISO/IEC JTC1/SC29/WG11), No. M14916, Oct. 17, 2007 (Oct. 17, 2007), XP030043522.

* cited by examiner

Primary Examiner — Leron Beck
Assistant Examiner — Berteau Joisil
(74) Attorney, Agent, or Firm — Mark H. Jay

(57) ABSTRACT

The compression of a video image is adaptively varied depending upon the uniformity of the image region being compressed.

7 Claims, 2 Drawing Sheets

ADAPTIVE VARIATION OF CHROMA SUBSAMPLING IN IMAGE COMPRESSION

BACKGROUND OF THE INVENTION

The invention relates to image compression. In its most immediate sense, the invention relates to a method for implementing JPEG compression of video images, the method being well-adapted for use in KVM applications.

In a KVM (Keyboard, Video, Mouse) system, digital images are sent from an originating computer to one or more receiving computers over a network (e.g. a LAN or the Internet). In a conventional KVM system, RGB video signals representing an image are compressed into a digital bitstream in the originating computer, the resulting bitstream is directed to the receiving computer(s) over the network, and the bitstream is decoded in the receiving computer(s) to create RGB video signals that reproduce the image when displayed on the computer monitor.

As a practical matter, many KVM applications cannot transmit a video image bitstream containing all the detail that is in the original video image. Even small video images contain a substantial quantity of information. Transmission of all that information can require substantial bandwidth and can reduce the speed of propagation over the network, effectively reducing the frame rate and causing artifacts to appear in the reconstructed image. For this reason, the encoding of an RGB signal into a digital bitstream usually requires a reduction of the amount of information in the original image. This process of reduction is known as "compression".

One approach for compressing video images is JPEG compression. In JPEG compression, each analog video frame is encoded into tiles. Each tile contains 256 pixels arranged in a 16×16 array. The pixels in each tile are grouped into 64 2×2 blocks. Each pixel is described by a YUV color space triplet, in which Y represents a luminance value, U represents a first chroma component value, and V represents a second chroma component value. One common color space is known as YCbCr; in that color space Y represents luminance, Cb represents the blue-difference chroma component, and Cr represents the red-difference color component.

Engineering tradeoffs are required to manufacture a KVM system that 1) produces visually acceptable video images at the receiving computer(s) 2) without unacceptable lag, 3) using acceptable network bandwidth, 4) at an acceptable cost. It would be advantageous to provide a method for adaptively varying chroma subsampling that would simplify such tradeoffs.

US 2016/0261884 A1 proposes adaptive variation of the color sampling, bit depth, and color spaced used in JPEG encoding of a video sequence in order to improve encoding and decoding efficiency. However, there is no disclosure of how such adaptive variation should be carried out.

It would be advantageous to provide a compression method that would efficiently (i.e. rapidly) encode a video image that could be rapidly propagated on a network such as a LAN or the Internet, but that when efficiently (i.e. rapidly) decoded would nonetheless produce a high-quality image on a video monitor without the need for expensive encoding and decoding hardware.

The invention proceeds from a realization that the efficiency of image compression—not only of video images, but still images as well—can be improved by adaptively varying chroma subsampling in accordance with the uniformity of the image region being subsampled. If a particular image region is of low uniformity, high-resolution chroma subsampling is required to accurately reproduce that image region. Conversely, if a particular image region is of high uniformity, use of high-resolution chroma subsampling would be a wasteful use of computer resources because low-resolution chroma subsampling can accurately reproduce that image region.

The invention further proceeds from successful experiments conducted on video images using:

1. a YUV color space in which Y represents luminance value, U represents a first chroma component value, and V represents a second chroma component value, and
2. three commonly-used chroma subsampling techniques, namely 4:4:4, 4:2:2, and 4:2:0.

In these experiments, the chroma subsampling technique utilized for JPEG compression was adaptively varied on a tile by tile basis. The pixel blocks in each tile were classified as being either low-uniformity, intermediate-uniformity, or neither. If a tile contained one or more low-uniformity pixel blocks, every pixel block in that tile was compressed using high-resolution 4:4:4 chroma subsampling. If a tile contained no low-uniformity pixel blocks, but did contain one or more intermediate-uniformity pixel blocks, every pixel block in that tile was compressed using intermediate-resolution 4:2:2 chroma subsampling. And, if a tile contained no low-uniformity pixel blocks and no intermediate-uniformity pixel blocks, every pixel block in that tile was compressed using low-resolution 4:2:0 chroma subsampling. The resulting adaptively compressed JPEG bitstream was then decoded.

Experiment has shown that the decoded RGB video signal produced a high quality reconstructed image comparable to that produced using high-resolution 4:4:4 chroma subsampling but consuming less bandwidth.

The classification can use simple calculations that can be carried out quickly by inexpensive hardware. Additionally, as is described in more detail below, higher resolution chroma subsampling is used only in image areas that require it. All these factors contribute to encoding efficiency.

In the preferred embodiment, the color space is YCbCr, in which Y represents luminance value, Cb represents blue difference chroma component value, and Cr represents red difference chroma component value. Further, in the preferred embodiment each of the Y value, U value, and V value is expressed as an 8 bit binary number.

BRIEF DESCRIPTION OF THE DRAWINGS

The invention will be better understood in connection with the exemplary and non-limiting drawings, in which.

DETAILED DESCRIPTION OF PREFERRED EMBODIMENTS

Figure 1:
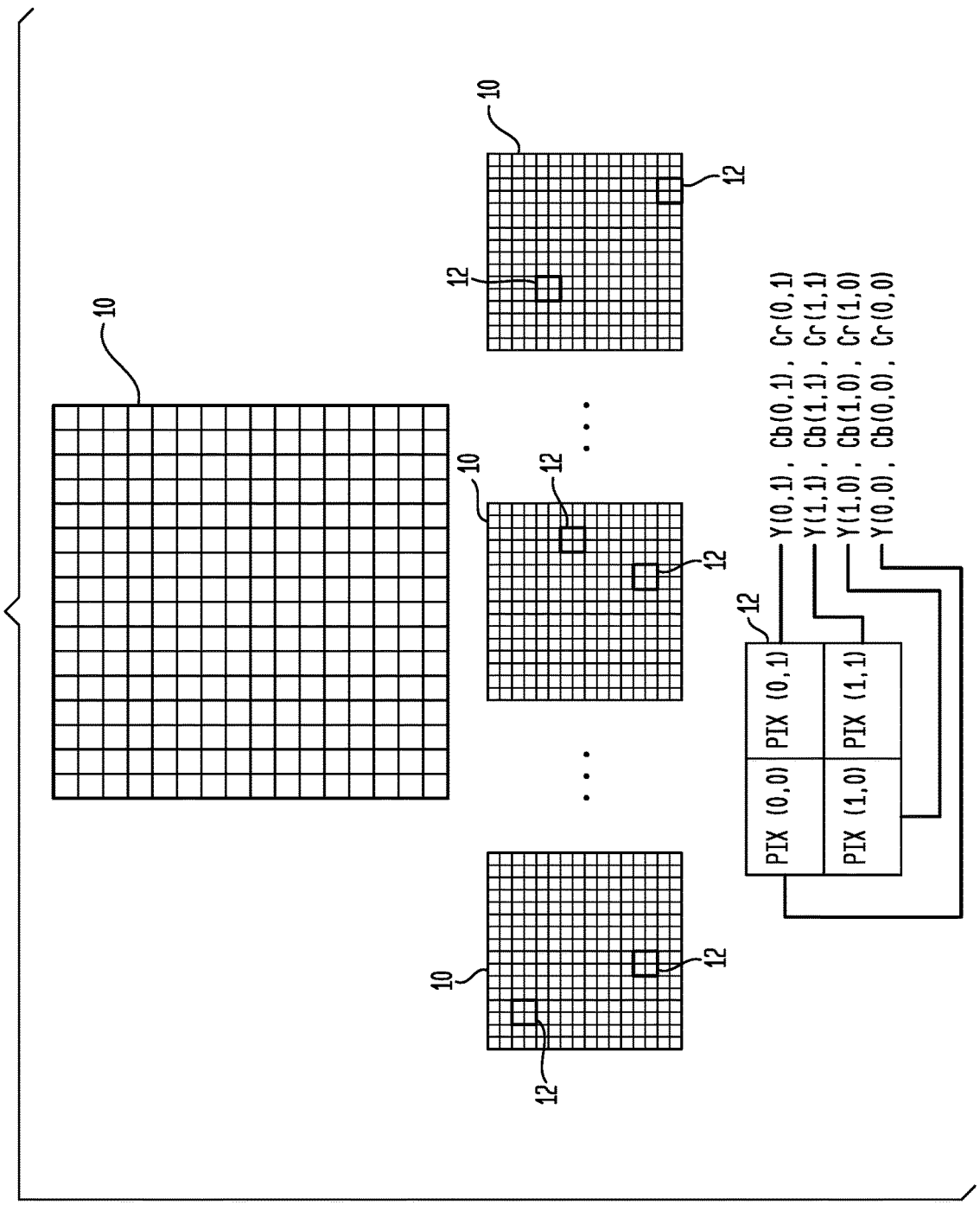
FIG. 1 schematically illustrates a series of tiles, their constituent pixel blocks, and the representation of the four pixels in a single pixel block.

The preferred embodiment of the invention uses the YCbCr color space, in which Y indicates the luminance value, Cb indicates the blue difference chroma component value, and Cr indicates the red difference color component value. However, this is not required, and other color spaces can be used instead. Furthermore, the preferred embodiment is an 8 bit system, i.e. the various values are expressed as 8 bit digital numbers, with the minimum value being −128 and the maximum value being +127. This is also not required; other bit depths can be used.

The preferred embodiment disclosed herein is used with JPEG compression of video images, for use in a KVM application. However, the invention is applicable to any type of compression, and not merely JPEG compression. Furthermore, the invention is not limited to use on video images; it can be used on still images as well. And, the invention is not limited to use in a KVM application.

In the following description, it is assumed that a video image (not shown) has been formed or captured, that the image has originally been represented by a video signal (usually, an RGB video signal, not shown) that displays video frames (not shown) on a computer monitor, and that the video frames are to be digitized using JPEG compression in which chroma subsampling is adaptively varied. In the below description, it is assumed that high-resolution chroma subsampling is 4:4:4, that intermediate-resolution chroma subsampling is 4:2:2, and that low-resolution chroma subsampling is 4:2:0, because these types of chroma subsampling are in common use. However, this is not necessary and other chroma subsampling techniques can be used instead.

Conventionally, a digitized video frame (not shown) contains a plurality of tiles 10. Each tile 10 contains a 16×16 array of 256 pixels that are grouped into 64 2×2 blocks 12. Each pixel block 12 contains 4 pixels, namely: pix (0,0); pix (0,1); pix (1,0); and pix (1,1). Each of the pixels pix (0,0), pix (0,1), pix (1,0), and pix (1,1) is represented by a YCbCr triplet. For example:

pix (0,0) has a luminance Y(0,0), a blue difference chroma component Cb(0,0), and a red difference chroma component Cr(0,0);

pix (0,1) has a luminance Y(0,1), a blue difference chroma component Cb(0,1), and a red difference chroma component Cr(0,1);

pix (1,0) has a luminance Y(1,0), a blue difference chroma component Cb(1,0), and a red difference chroma component Cr(1,0); and pix (1,1) has a luminance Y(1,1), a blue difference chroma component Cb(1,1), and a red difference chroma component Cr(1,1).

Three chroma subsampling schemes are conventionally used. These are known as 4:4:4 subsampling (high-resolution subsampling), 4:2:2 subsampling (intermediate-resolution subsampling), and 4:2:0 subsampling (low-resolution subsampling).

In high-resolution 4:4:4 subsampling, each pixel in a pixel block retains its original Y, Cb and Cr values. In intermediate-resolution 4:2:2 subsampling, each pixel in the pixel block retains its original Y value but the original Cb and Cr values are replaced by averages, whereby $$Cb\_top=(Cb(0,0)+Cb(0,1))/2$$

$$Cr\_top=(Cr(0,0)+Cb(0,1))/2$$

$$Cb\_bottom=(Cb(1,0)+Cb(1,1))/2$$

$$Cr\_bottom=(Cr(1,0)+Cb(1,1))/2$$

so that pix (0,0), when compressed using intermediate-resolution 4:2:2 subsampling, would have a luminance Y(0,0), a blue difference chroma component Cb top, and a red difference chroma component Cr top;

pix (0,1), when compressed using intermediate-resolution 4:2:2 subsampling, would have a luminance Y(0,1), a blue difference chroma component Cb top, and a red difference chroma component Cr top;

pix (1,0), when compressed using intermediate-resolution 4:2:2 subsampling, would have a luminance Y(1,0), a blue difference chroma component Cb bottom, and a red difference chroma component Cr bottom; and pix (1,1), when compressed using intermediate-resolution 4:2:2 subsampling, would have a luminance Y(1,1), a blue difference chroma component Cb bottom, and a red difference chroma component Cr bottom.

Clearly, use of intermediate-resolution 4:2:2 subsampling would result in data compression, because it would cause pix (0,0) to have the same chroma components as pix (0,1) and likewise would cause pix (1,0) to have the same chroma components as pix (1,1).

Low-resolution 4:2:0 subsampling would result in further data compression. When compressed using low-resolution 4:2:0 subsampling, pix (0,0) would have a luminance Y(0,0), a blue difference chroma component Cb average, and a red difference chroma component Cr average;

pix (0,1) would have a luminance Y(0,1), a blue difference chroma component Cb average, and a red difference chroma component Cr average;

pix (1,0) would have a luminance Y(1,0), a blue difference chroma component Cb average, and a red difference chroma component Cr average; and pix (1,1) would have a luminance Y(1,1), a blue difference chroma component Cb average, and a red difference chroma component Cr average where $$Cb\_avg=(Cb\_top+Cb\_bottom)/2$$

$$Cr\_avg=(Cr\_top+Cr\_bottom)/2$$

Clearly, low-resolution 4:2:0 subsampling would produce still more data compression, because all four pixels would have the same chroma components.

Figure 2:
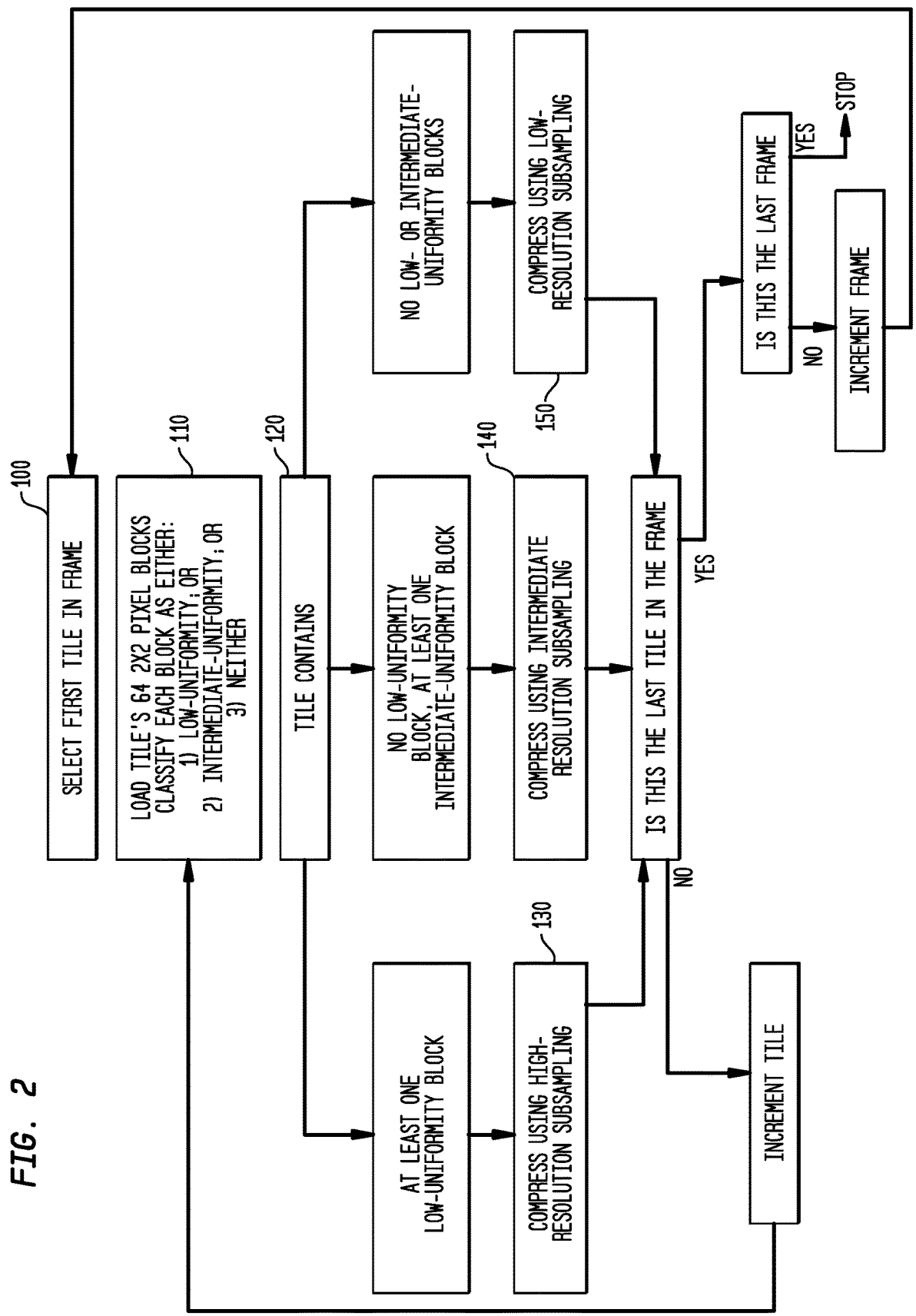
FIG. 2 is a flow chart that schematically illustrates a preferred embodiment of the invention.

In accordance with the preferred embodiment herein, and as is shown in FIG. 2, the chroma subsampling technique employed during JPEG compression of video images is adaptively varied on a tile by tile basis in such a manner as to use the minimum resolution chroma subsampling needed to properly encode the tile being compressed. Initially, in step 100, the first tile in the video frame is loaded into the computer hardware (not shown). Then, in step 110, each pixel block is classified as either low-uniformity, intermediate-uniformity, or neither. If on review (step 120) a tile contains at least one low-uniformity pixel block, the entire tile is compressed using high-resolution 4:4:4 chroma subsampling (step 130). If on review (step 120) a tile contains no low-uniformity pixel blocks but does contain at least one intermediate-uniformity pixel block, the entire tile is compressed using intermediate-resolution 4:2:2 chroma subsampling (step 140). And, if on review (step 120) a tile contains no low-uniformity pixel blocks and no intermediate-uniformity pixel blocks, the entire tile is compressed using low-resolution 4:2:0 chroma subsampling (step 150). If the tile is the last tile in the frame, the compression process stops. If not, the next tile is loaded into the computer hardware and the entire process is repeated until all the tiles in all the frames have been compressed.

Ordinarily but not necessarily, the computer hardware (not shown) will be capable of carrying out step 110 on all the pixel blocks in a tile simultaneously. However, there may be applications in which the available hardware is incapable of doing this, and in such applications the pixel blocks will be classified in a series.

In accordance with the preferred embodiment, three image characteristics are used to classify the uniformity of a pixel block. The first is the variation of luminance within the block, the second is the variation of each chroma component within the block, and the third is the total chroma content in various parts of the block or in the block as a whole.

If within a pixel block the luminance of the pixels is similar, this increases the likelihood that higher resolution chroma subsampling will be required to encode that block with adequate accuracy. Similarly, if within a pixel block each of the chroma components is dissimilar, this also increases the likelihood that higher resolution chroma subsampling will be required to encode that block with adequate accuracy. Finally, if a pixel block has a substantial color content, this likewise increases the likelihood that higher resolution chroma subsampling will be required to encode that block with adequate accuracy.

In accordance with the preferred embodiment, the classification of a pixel block is determined by using the above-identified characteristics. In a low-uniformity pixel block, the conditions specified in A below must be true, or the conditions specified in B below must be true, or both.
  A. The top two pixels pix (0,0) and pix (0,1) must have similar luminance, the top two pixels pix (0,0) and pix (0,1) must have dissimilar colors, and the total color content of the top two pixels pix (0,0) and pix (0,1) must be large.
  B. The bottom two pixels pix (1,0) and pix (1,1) must have similar luminance, the bottom two pixels pix (1,0) and pix (1,1) must have dissimilar colors, and the total color content of the bottom two pixels pix (1,0) and pix (1,1) must be large. In an intermediate-uniformity pixel block:
  a) Either the left two pixels pix (0,0) and pix (1,0) must have similar luminance or the right two pixels pix (0,1) and pix (1,1) must have similar luminance, or both; and
  b) the left two pixels pix (0,0) and pix (1,0) must have a color that is dissimilar to the color of the right two pixels pix (0,1) and pix (1,1); and
  c) the total color content of all four pixels pix (0,0), pix (1,0), pix (0,1), and pix (1,1) must be large.

In the preferred embodiment, these tests are implemented using the following simple algorithms:

$abs(Y(0,0)-Y(0,1))$ must $<128$     Test A:

$abs(Cb(0,0)-Cb(0,1))+abs(Cr(0,0)-Cr(0,1))$ must $>64$     Test B:

$abs(Cb\_top)+abs(Cr\_top)$ must $>64$     Test C:

$abs(Y(1,0)-Y(1,1))$ must $<128$     Test D:

$abs(Cb(1,0)-Cb(1,1))+abs(Cr(1,0)-Cr(1,1))$ must $>64$     Test E:

$abs(Cb\_bot)+abs(Cr\_top)$ must $>64$     Test F:

$abs(Y(0,0)-Y(1,0))$ must $<128$     Test a:

$abs(Y(0,1)-Y(1,1))$ must $<128$     Test b:

$abs(Cb\_top-Cb\_bottom)+abs(Cr\_top-Cr\_bottom)$ must $>64$     Test c:

$abs(Cb\_avg)+abs(Cr\_avg)$ must $>64$     Test d:

where (as above)

$Cb\_top=(Cb(0,0)+Cb(0,1))/2$ $Cr\_top=(Cr(0,0)+C[b]r(0,1))/2$ $Cb\_bottom=(Cb(1,0)+Cb(1,1))/2$ $Cr\_bottom=(Cr(1,0)+C[b]r(1,1))/2$ $Cb\_avg=(Cb\_top+Cb\_bottom)/2$ $Cr\_avg=(Cr\_top+Cr\_bottom)/2$ The above algorithms used the values 64 and 128 because those values produced excellent results. Those values are not part of the invention, and may be changed.

It will be understood that this adaptive variation of chroma subsampling can be carried out on static images as well as video images. A static image is made up of a single frame that contains a plurality of tiles (as opposed to a plurality of frames that differ slightly from one frame to the next), and these tiles can be compressed in exactly the same way that each of the tiles in a video image is compressed.

Although a preferred embodiment has been described above, the invention is limited only by the following claims:

The invention claimed is:

1. A method for adaptively varying chroma subsampling in compression of a video feed comprising a series of video frames, each video frame containing a plurality of tiles, and each tile containing a predefined plurality of non-overlapping pixel blocks with each pixel block containing four pixels and having an upper pixel pair and a lower pixel pair, each pixel being described by a YUV color space triplet in which Y represents luminance value, U represents a first chroma component value, and V represents a second chroma component value, comprising:
  a. establishing categories of uniformity into which the pixel blocks can be uniquely classified, said categories including low-uniformity and intermediate-uniformity, a pixel block being in the low uniformity category only if
  i) the pixels in the upper pixel pair have similar luminance values, the pixels in the upper pixel pair have dissimilar colors, and the total color content of the pixels in the upper pixel pair exceeds a predetermined threshold value, or
  ii) the pixels in the lower pixel pair have similar luminance values, the pixels in the lower pixel pair have dissimilar colors, and the total color content of the pixels in the lower pixel pair exceeds a predetermined threshold value, or
  iii) the pixels in the upper pixel pair have similar luminance values, the pixels in the upper pixel pair have dissimilar colors, and the total color content of the pixels in the upper pixel pair exceeds a predetermined threshold value, and the pixels in the lower pixel pair have similar luminance values, the pixels in the lower pixel pair have dissimilar colors, and the total color content of the pixels in the lower pixel pair exceeds a predetermined threshold value;
  b. scanning all pixel blocks within each tile to determine whether any pixel block therein falls into one of the categories;
  c. if at least one pixel block within a tile is in the low-uniformity category, encoding every one of the pixel blocks in the tile using high-resolution chroma subsampling;

d. if no pixel block within a tile is in the low-uniformity category and at least one pixel block within a tile is in the intermediate-uniformity category, encoding every one of the pixel blocks in the tile using intermediate-resolution chroma subsampling;

and e. if no pixel block within a tile is in the low-uniformity category or in the intermediate-uniformity category, encoding every one of the pixel blocks in the tile using low-resolution chroma subsampling.

2. The method of claim 1, wherein the compression is JPEG compression.

3. The method of claim 1, wherein all blocks within each tile are classified simultaneously.

4. The method of claim 1, wherein the high-resolution chroma subsampling is 4:4:4, the intermediate-resolution chroma subsampling is 4:2:2, and the low-resolution chroma subsampling is 4:2:0.

5. The method of claim 1, wherein the YUV triplet is a YCbCr triplet, in which Y represents luminance value, Cb represents blue difference chroma component value, and Cr represents red difference chroma component value.

6. The method of claim 1, wherein each of the Y value, U value, and V value is expressed as an 8 bit binary number.

7. The method of claim 1, wherein each pixel block has a left pixel pair and a right pixel pair and wherein the pixel block is in the intermediate-uniformity category only if:

a. the pixel block is not in the low-uniformity category; and b. the pixels in the left pixel pair have similar luminance values or the pixels in the right pixel pair have similar luminance values, or the pixels in the left pixel pair have similar luminance values and the pixels in the right pixel pair have similar luminance values; and c. the pixels in the left pixel pair have a color that is dissimilar to the color of the pixels in the right pixel pair; and d. the total color content of all four pixels exceeds a predefined threshold value.

\* \* \* \* \*